United States Patent [19]

Hayashi et al.

[11] Patent Number: 4,909,368
[45] Date of Patent: Mar. 20, 1990

[54] FLUID COUPLING APPARATUS

[75] Inventors: Masaharu Hayashi, Toyota; Seiya Tanaka, Bisai, both of Japan

[73] Assignee: Aisin Seiki Kabushiki Kaisha, Kariya, Japan

[21] Appl. No.: 251,526

[22] Filed: Sep. 30, 1988

[30] Foreign Application Priority Data

Sep. 30, 1987 [JP] Japan .................. 62-149789

[51] Int. Cl.4 ............................. F16D 35/00
[52] U.S. Cl. ................... 192/58 B; 192/82 T
[58] Field of Search ............ 192/58 B, 82 T; 123/41.12

[56] References Cited

U.S. PATENT DOCUMENTS

| 3,263,783 | 8/1966 | Sutaruk | 192/58 B |
|---|---|---|---|
| 4,295,550 | 10/1981 | Hayashi | 192/58 B |
| 4,298,111 | 11/1981 | Hayashi | 192/58 B |
| 4,446,952 | 5/1984 | Masai | 192/58 B |
| 4,469,209 | 9/1984 | Hayashi et al. | 192/58 B |
| 4,502,580 | 3/1985 | Clancey | 192/58 B |
| 4,627,524 | 12/1986 | Hayashi et al. | 192/58 B |
| 4,702,360 | 10/1987 | Tanaka | 192/58 B |

FOREIGN PATENT DOCUMENTS

| 55-69326 | 5/1980 | Japan. | |
|---|---|---|---|
| 55-69327 | 5/1980 | Japan | 192/58 B |
| 58-160632 | 9/1983 | Japan | 192/58 B |

Primary Examiner—Leslie A. Braun
Assistant Examiner—Richard M. Lorence
Attorney, Agent, or Firm—Burns, Doane, Swecker & Mathis

[57] ABSTRACT

A fluid coupling apparatus has a three stage control for torque transmission. The apparatus has two slots, of which one slot is opened when the temperature reaches a first set temperature. The other slot is opened at a second set temperature. The latter slot has a shape which increases the opening gradually in accordance with the movement of a valve member so that the torque transmission is gradually increased from the second torque transmission state to the third torque transmission state.

2 Claims, 4 Drawing Sheets

FLUID COUPLING APPARATUS

BACKGROUND OF THE INVENTION

1. Field of the Invention

The present invention relates to a fluid coupling apparatus which can control output torque of the coupling through three stages in response to a temperature.

2. Description of the Prior Art

As to a conventional fluid coupling for driving a cooling fan of an automobile, fluid flow between a storage chamber and a working chamber is controlled in two stages in order to reduce a power loss in addition to preventing the engine from excess cooling. However, in this two stage control, because rotation of the fan is simply switched from high speed to low speed at a set temperature, the fluid coupling apparatus may cause noise and may cool the engine too much or less than expected.

In order to overcome these drawbacks, for example, in Japanese Patent Laid-Open 55(1980)-69326, a fluid coupling apparatus which controls fluid flow in three stages was developed. In such a three stage controlled fluid coupling apparatus, two slots are provided on a plate which divides the storage chamber and the working chamber for connecting both chambers. If the temperature is under a first set value, a thermal responsive member closes the two slots so that the fan is controlled to a low number of revolutions by limiting the flow of the fluid (see FIG. 5). When the temperature reaches the set value, the thermal responsive member opens one of the slots to supply the fluid into the working chamber. The fan is then controlled to a medium number of revolutions (see FIG. 5). If the temperature goes to the second set temperature, the thermal responsive member opens both of the slots in order to provide a maximum torque increase. The fan is then controlled to provide a high number of revolutions (see FIG. 5). Accordingly, the fluid coupling apparatus controls the fan revolution in three stages.

However, in the three stage fluid coupling apparatus of the prior art, as shown in FIG. 5, the fan revolutions are changed in a step by step fashion in accordance with the first and second set temperatures. Therefore, the changes in revolutions are abrupt at the set temperatures and especially at the second set temperature as fan noise is quite loud and generates an uncomfortable feeling. The revolution change also causes an abrupt torque change; therefore, the shock of the torque change adversely affects the fan belt's life. The reasons of this large fan noise is the abrupt change in the fan revolutions and the absolute level of the fan noise is large because of the high level of fan revolutions.

SUMMARY OF THE INVENTION

Accordingly, one of the objects of the present invention is to provide a fluid coupling apparatus which obviates the above drawbacks.

Another object of the present invention is to prevent abrupt changes of the fan revolutions by linearly controlling the fan revolutions between a second step and a third step.

A further object of the present invention is to prevent abrupt changes in the torque so that the load to the fan belt is reduced.

To achieve the above objects, and in accordance with the principles of the invention as embodied and broadly described herein, a thermally responsive member of the fluid coupling apparatus gradually controls the opening of a first slot in accordance with the temperature increase after the temperature reaches a second set value.

In accordance with the above-described apparatus, when the temperature is below a first set temperature, the thermally responsive member is not responsive and the slots are closed to interrupt the fluid flow between the storage chamber and the working chamber. At this time, the fluid in the working chamber is transmitted to the storage chamber by a pumping mechanism and the torque is transmitted by the smallest amount of the fluid. Thus the fan rotates at a low number of revolutions. The thermally responsive member begins to operate in accordance with an increase of the temperature. If the temperature reaches the first set temperature, the second slot is opened to supply the fluid to the second torque transmission surface only. Then the transmitted torque is at a medium level and the number of fan revolutions is controlled to a medium level. When the temperature reaches the second set temperature, the thermal responsive member begins to gradually open the first slot in a radial direction. Because the fluid in the storage chamber is moved to the circumference of the casing by centrifugal force caused by the casing rotation, the flow of the fluid from the storage chamber to the working chamber increases linearly in accordance with a gradual increase of the slot opening in the radial direction. Thus the transmitted torque by the first torque transmission surface increases linearly. Therefore, the fan revolution gradually increases in a linear manner corresponding to the temperature increase after reaching the second set temperature.

BRIEF DESCRIPTION OF THE DRAWINGS

For a full understanding of the scope of the invention, the following detailed description should be read in conjunction with the drawings wherein.

DETAILED DESCRIPTION OF THE PREFERRED EMBODIMENTS

In the following, preferred embodiments of the present invention will be described with reference to the drawings.

Figure 1:
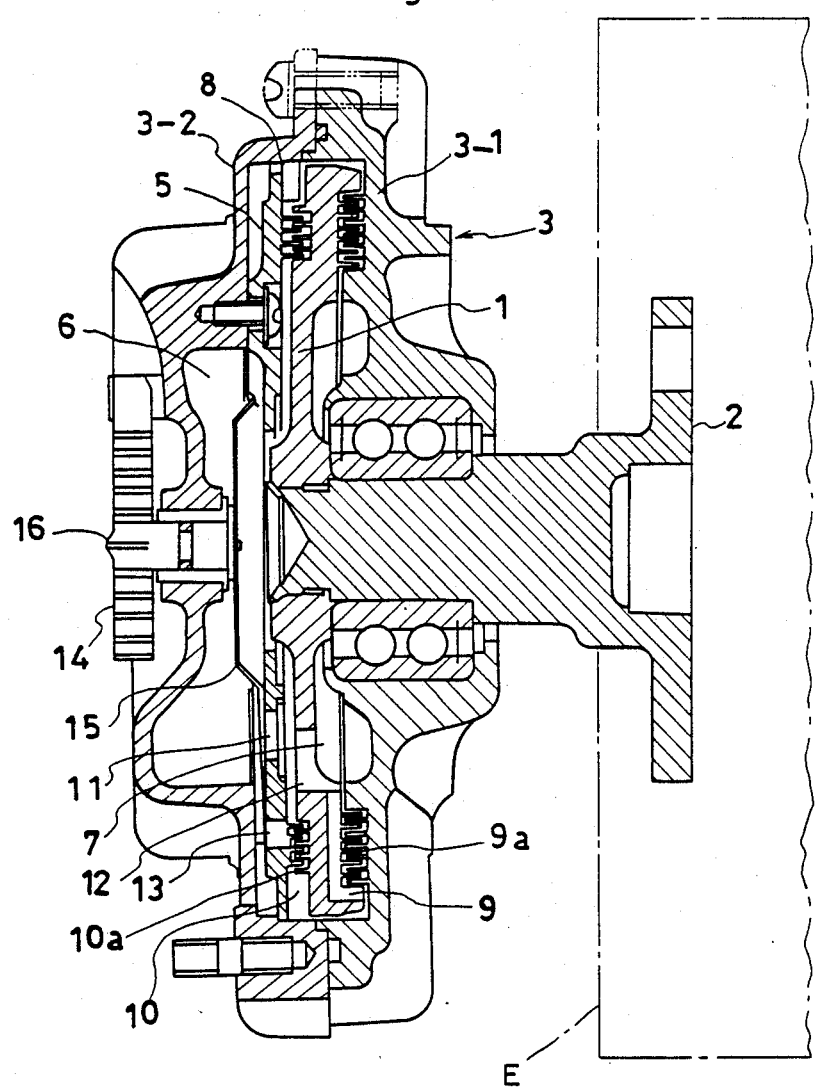
FIG. 1 is a cross-section view showing a fluid coupling apparatus of the present invention.

FIG. 1 illustrates one embodiment of a fluid coupling apparatus of the present invention. Referring to FIG. 1, the apparatus has an input member 2 driven by an engine E of a vehicle and an output member 3 mounted on the input member 2 rotatable thereon through a bearing. The output member 3 comprises a base member 3-1 mounted on the input member 2 and a cover member 3-2. The base member and the cover member comprise a casing. A fan assembly is fixed to the output member 3 by any known means.

Figure 2:
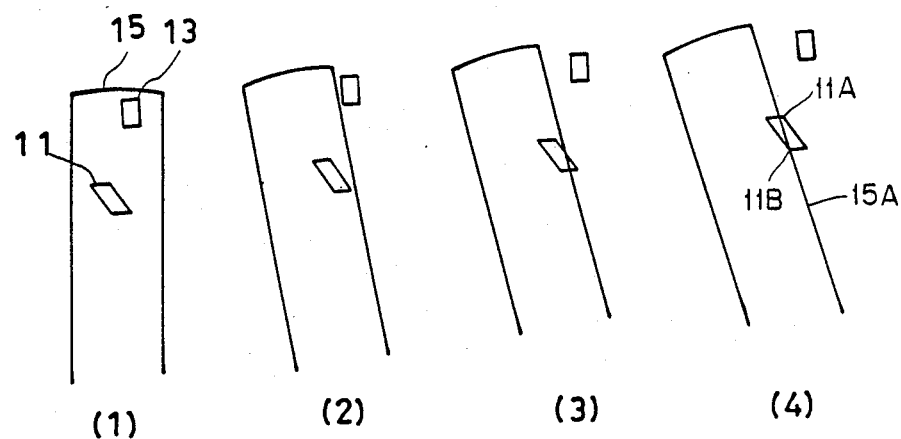
FIG. 2 is a showing of the valve member and slots of the invention.

A rotor 1 is coupled to one end of the input member 2 and includes a labyrinth 9a between an outer surface of the rotor 1 and the base member 3-1 and which acts as the first torque transmission surface from the rotor 1 to the output member 3. A plate 5, attached to a shoulder portion of the cover member 3-2 of the output member 3, divides the casing of the output member 3 into a working chamber 7 (which includes the rotor 1) and a storage chamber 6. A fluid is stored in the storage chamber 6, which may be for example silicon oil, and is transmitted to the working chamber through a first slot 11 provided on the plate 5 and then to the first torque transmitting surface 9 through a fluid passage 12. When the input member 2 rotates, torque is transmitted from the input member 2 to the output member 3 by the fluid in the working chamber 7. Between the opposite side of the plate 5 and the rotor 1, a labyrinth 10a is provided as the second torque transmission surface 10. The second slot 13, which is of smaller area than the first slot 11, is provided on the plate 5. When fluid flows from the storage chamber 6 to the working chamber 7 through the second slot 13, the fluid passes the second torque transmitting surface 10 and torque is transmitted from the input member 2 to the output member 3. The first slot 11 is positioned radially interiorly of the second slot 13 and is fluidly connectable with the fluid passage 12. The first slot 11 is shaped such that, when a valve member 15 rotates to open the slot 11, for example a parallelogram is formed as shown in FIG. 2, which begins to open from an inner side and gradually increases the opening toward an outer side. At one point, the trailing edge 15A of the valve 15 simultaneously intersects two diagonally opposite corners 11A, 11B of the parallelogram. However, this shape may be varied into other shapes which increase the opening gradually toward the outer side in accordance with movement of the valve member 15.

Fluid flow from the working chamber 7 to the storage chamber 6 is caused by a pumping element 8 provided on the plate 5. The amount of the fluid in the working chamber 7 depends on the degree of input flow through the first slot 11 and output flow through the pumping element 8. The pumping element 8 can be provided on the casing.

A thermally responsive member, for example a spiral bimetal element 14, is provided. One end of the bimetal 14 is connected to the cover member 3-2 and the other end of the bimetal is connected to a rod 16. The rod 16 is connected to the valve member 15. Thus, the bimetal 14 rotates the rod 16 and the valve 15 in response to the temperature. Referring to FIG. 2, when the temperature is below the first set value, as shown in (1) of FIG. 2 the first and second slots 11 and 13 are closed by the valve member 15. When the temperature increases to the first set value, the bimetal 14 rotates the rod 16 to the position where the valve 15 opens the second slot 13 to the degree as shown in (2) of FIG. 2. If the temperature reaches the second set value, the valve 15 is moved to such an extent that the first slot 11 begins to open in addition to the open second slot 13, as shown in (3) of FIG. 2.

According to the above mentioned embodiment, when the vehicle is driven in cold air, that is when the temperature is below the first set temperature, for example 40° C., the valve member 15 closes both slots 11 and 13. The fluid in the working chamber 7 is transmitted to the storage chamber 6 by the pumping mechanism. Thus, the fan is kept at a low revolution or speed as shown in the region 1 of FIG. 3. When the bimetal 14 detects the first set temperature, the valve member 15 opens the second slot 13. The fan revolution or speed is increased during a first speed-increasing stage as it is dependent on the fluid flow passing the second torque transmission surface 10 through the second slot 13 as shown in the region 2 of FIG. 3.

When the bimetal detects the second set temperature, for example 70° C., the valve 15 begins to open the first slot 11. At this time, the fluid in the storage chamber 6 is transmitted to the outer side of the cover member 3-2 by centrifugal force created by the rotation of the output member 3. Because of the shape of parallelogram of the first slot 11, the valve member 15 opens the first slot 11 from an inner side to an outer side in a gradual manner as shown in regions (2) to (4) of FIG. 2 and the fluid which is supplied to the fluid passage 12 gradually increases. Therefore, the torque transmitted by the first torque transmission surface 9 is gradually added to the torque transmitted by the second torque transmission surface 10. FIG. 4 shows this transition as the third step. Thus the fan revolution changes gradually as shown in the second speed-increasing stage 3 of FIG. 3.

Figure 3:
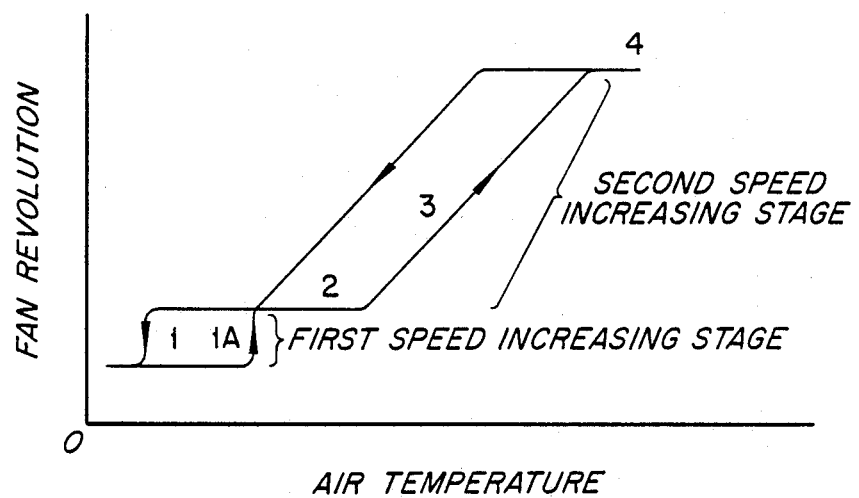
FIG. 3 is a graph showing a characteristic between the temperature of the air and the fan revolution of the present invention.
Figure 4:
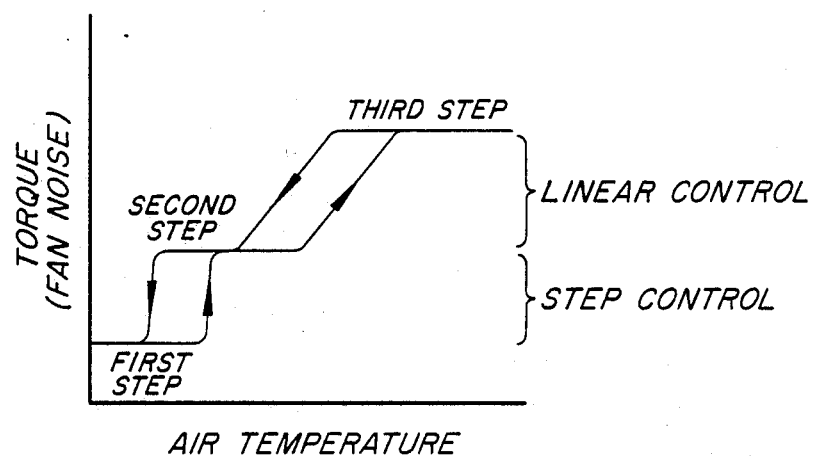
FIG. 4 is a graph showing a characteristic between the temperature of the air and the transmitted torque of the present invention.
Figure 5:
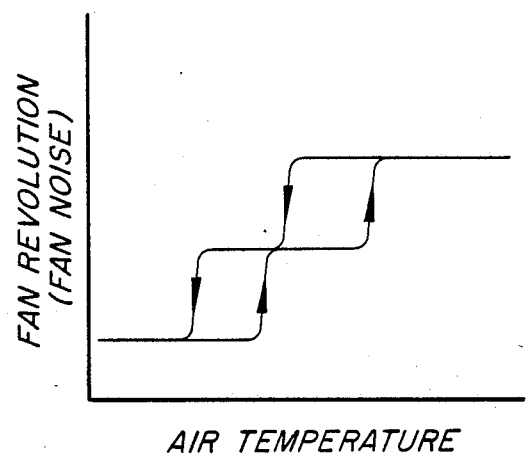
FIG. 5 is a graph showing a characteristic between the temperature of the air and the fan revolution of the conventional fluid coupling apparatus.

The line 1A for the first speed-increasing stage is essentially at ninety degrees to the abscissa in FIG. 3 thereby reflecting a very abrupt rate of fan speed increase per unit temperature change. On the other hand, the forty-five degree slop of the line 3 representing the second speed-increasing stage is reflective of a much more gradual (e.g., about one-half) rate of fan speed increase per unit temperature increase.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A fluid coupling apparatus comprising:
   an output member including a casing defining fluid-containing chamber means, and plate means dividing said chamber means into a storage chamber and a working chamber, said plate means having radially spaced first and second fluid-conducting slots,
   an engine-driven input member rotatable relative to said output member and including a rotor disposed in said working chamber, said rotor having opposite first and second faces and a fluid passage;
   pumping means for circulating fluid from said working chamber to said storage chamber;
   first and second torque transmission surfaces disposed in said working chamber for transmitting torque from said input member to said output member,
   said second torque transmission surface defined between said first face of said rotor and a face of said plate means, said second torque transmission surface being communicable with fluid in said storage chamber through said second slot whereby said output member is rotated up to a first speed during a first speed-increasing stage;
   said first torque transmission surface defined between said second face of said rotor and a face of said output member, said first torque transmission surface being communicable with fluid in said storage chamber through said fluid passage and said first slot while said second fluid transmission surface remains in communication with said storage chamber whereby said output member is rotated up to a second speed greater than said first speed during a second speed-increasing stage;

a thermally responsive actuator exposed to ambient air, and valve means connected to said thermally responsive actuator to be displaced thereby in response to increases in ambient air temperature for effecting said first speed-increasing stage by unblocking said second slot when a first ambient air temperature is reached, and for effecting said second speed-increasing stage by unblocking said first slot while maintaining said second slot unblocked when a second ambient air temperature is reached, said second temperature being higher than said first temperature;

said valve means and said second slot being configured to establish a first rate of speed increase per unit temperature increase, and said valve means and said first slot being configured to establish a second rate of speed increase per unit temperature increase, said second rate being substantially less than said first rate.

2. A fluid coupling apparatus according to claim 1, wherein said valve means comprises a rotary valve member including a trailing edge which uncovers said slots, said second slot shaped as a parallelogram opposite diagonal corners of which are arranged to be simultaneously intersected by said trailing edge during said second speed-increasing stage.

* * * * *